US008836796B2

(12) United States Patent  (10) Patent No.: US 8,836,796 B2
Dickins et al.  (45) Date of Patent: Sep. 16, 2014

(54) METHOD AND SYSTEM FOR DISPLAY CHARACTERIZATION OR CALIBRATION USING A CAMERA DEVICE

(75) Inventors: Glenn Dickins, Jerrabomberra (AU); Simon Aridis-Lang, Hazelbrook (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 967 days.

(21) Appl. No.: 12/953,406

(22) Filed: Nov. 23, 2010

(65) Prior Publication Data

US 2012/0127324 A1 May 24, 2012

(51) Int. Cl.
 *H04N 17/02* (2006.01)
 *H04N 17/04* (2006.01)
 *G09G 3/00* (2006.01)
(52) U.S. Cl.
 CPC ....... *H04N 17/04* (2013.01); *G09G 2320/0693* (2013.01); *G09G 2360/145* (2013.01); *G09G 3/006* (2013.01)
 USPC .......................................... 348/189; 349/190
(58) Field of Classification Search
 USPC ......... 348/181, 189–191, 656–658, 745, 383; 702/112, 117; 445/3, 4, 63, 64
 See application file for complete search history.

(56) References Cited

U.S. PATENT DOCUMENTS

| | | | |
|---|---|---|---|
| 5,216,504 A * | 6/1993 | Webb et al. ................... | 348/190 |
| 5,351,201 A | 9/1994 | Harshbarger | |
| 5,537,145 A | 7/1996 | Miseli | |
| 5,572,444 A * | 11/1996 | Lentz et al. ................... | 702/117 |
| 5,602,932 A * | 2/1997 | Macdonald et al. .......... | 382/100 |
| 5,696,550 A * | 12/1997 | Aoki et al. ..................... | 348/125 |
| 5,818,520 A * | 10/1998 | Janko et al. ................... | 348/192 |
| 5,969,756 A * | 10/1999 | Buckley et al. ............... | 348/190 |
| 6,177,955 B1 * | 1/2001 | Downen et al. ............... | 348/189 |
| 6,771,323 B1 | 8/2004 | Dean | |
| 7,586,544 B2 * | 9/2009 | Han et al. ...................... | 348/515 |
| 2004/0012675 A1 * | 1/2004 | Caviedes ....................... | 348/180 |

(Continued)

FOREIGN PATENT DOCUMENTS

| | | |
|---|---|---|
| JP | 2009270870 | 11/2009 |
| WO | 2007020549 | 2/2007 |

OTHER PUBLICATIONS

Wikipedia, "Structure from Motion" 2010; available from: http://en.wikipedia.org/wiki/Structure from motion.

(Continued)

*Primary Examiner* — Victor Kostak

(57) ABSTRACT

In a class of embodiments, a method and system for characterizing a display device using a camera device (e.g., a consumer grade, mobile camera device) to sense light emitted by the display device during display of one or more test images, and to generate measurement data characterizing the display and/or calibration data useful for calibrating the display device. In some embodiments, the display device is adjusted or calibrated manually in response to such calibration data, for example by user actuation of display device controls in response to calibration data indicative of display setting recommendations. In some embodiments, the test image(s) are embedded in a video stream (e.g., overlaid on arbitrary video content). For example, test images including appropriate timing information and calibration sequences are embedded in a video stream for display by the display device. In some embodiments, the user is prompted to align the camera device (e.g., to position the camera device such that light emitted from a test image at least substantially fills the camera field of view).

45 Claims, 8 Drawing Sheets

(56) References Cited

U.S. PATENT DOCUMENTS

2009/0122132 A1    5/2009  Thielman
2010/0020970 A1*   1/2010  Liu et al. .................... 380/255
2013/0169706 A1*   7/2013  Harant et al. ................ 345/697

OTHER PUBLICATIONS

Spears. S. and D. Munsil, Spears & Munsil High-Definition Benchmark Blu-ray Disc Edition. 2008, B001UM29OC.

* cited by examiner

METHOD AND SYSTEM FOR DISPLAY CHARACTERIZATION OR CALIBRATION USING A CAMERA DEVICE

BACKGROUND OF THE INVENTION

1. Field of the Invention

Some embodiments of the invention are systems and methods for characterizing a display using a camera device (e.g., a handheld or other mobile camera device) to measure light emitted by the display, and optionally also to calibrate the display using control parameters determined using measurements of the light by the camera device.

2. Background of the Invention

Throughout this disclosure including in the claims, the expression performing an operation "on" signals or data (e.g., filtering the signals or data) is used in a broad sense to denote performing the operation directly on the signals or data, or on processed versions of the signals or data (e.g., on versions of the signals that have undergone preliminary filtering prior to performance of the operation thereon).

Throughout this disclosure including in the claims, the expression "system" is used in a broad sense to denote a device, system, or subsystem. For example, a subsystem that implements a filter may be referred to as a filter system, and a system including such a subsystem (e.g., a system that generates X output signals in response to multiple inputs, in which the subsystem generates M of the inputs and the other X-M inputs are received from an external source) may also be referred to as a filter system.

Throughout this disclosure including in the claims, the noun "display" and the expression "display device" are used as synonyms to denote any device or system operable to display an image or to display video in response to an input signal. Examples of displays are computer monitors, television sets, and home entertainment system monitors or projectors.

Throughout this disclosure including in the claims, the terms "calibration" and "recalibration" of a display denote adjusting at least one parameter or characteristic of the display, e.g., color, brightness, contrast, and/or dynamic range characteristics of the display. For example, calibration of a display device can be implemented by performing preprocessing or other processing on input image data (to be displayed by the display device) to cause the light emitted by the display device in response to the preprocessed (or otherwise processed) image data (typically after further processing is performed thereon) to have one or more predetermined color, brightness, contrast, and/or dynamic range characteristics. In accordance with some embodiments of the invention, calibration is performed "automatically" in the sense that it is performed without human user intervention.

Throughout this disclosure including in the claims, the term "processor" is used in a broad sense to denote a system or device programmable or otherwise configurable (e.g., with software or firmware) to perform operations on data (e.g., video or other image data). Examples of processors include a field-programmable gate array (or other configurable integrated circuit or chip set), a digital signal processor programmed and/or otherwise configured to perform pipelined processing on video or other image data, a programmable general purpose processor or computer, and a programmable microprocessor chip or chip set.

Throughout this disclosure including in the claims, measured "light intensity" is used in a broad sense, and can denote measured luminance or another measured indication of light intensity appropriate in the context in which the expression is used.

Throughout this disclosure including in the claims, the term "camera" is used in a broad sense to denote a light sensor (e.g., a colorimeter or other sensor whose output can be analyzed to determine a color or frequency spectrum of sensed light), or a camera including an image sensor array (e.g., a CCD camera), or a camera of any other type. Typical embodiments of the invention employ a mobile device which includes a camera operable to sense an image displayed by a monitor or other display and to output data indicative of the sensed image (or one or more pixels thereof).

Throughout this disclosure including in the claims, the expression "mobile device" denotes a device which is readily portable by a human user. An example of a mobile device is a handheld device, which is configured to be held in a human user's hand during use and is typically carried by a human user between uses.

Throughout this disclosure including in the claims, the expression "camera device" denotes a device which includes (e.g., is) a camera and a processor coupled to receive the camera's output, and which is operable to measure at least one characteristic of light emitted by a display device (e.g., while the display device displays at least one test image). For example, a mobile phone which includes a camera and a processor coupled to receive the camera's output may be a camera device as defined in this paragraph. Typical embodiments of the invention include or employ a camera device which is a mobile device.

Throughout this disclosure including in the claims, the expression "uncalibrated camera device" denotes a camera device which includes (e.g., is) a camera and a processor coupled to receive the camera's output, and which is operable to measure at least one characteristic of light emitted by a display device (e.g., while the display device displays at least one test image) in a manner emulating measurement of the same light by a reference camera having known sensitivity function but without preknowledge of the sensitivity function of the camera device's camera. Some embodiments of the invention include or employ an uncalibrated camera device which is a mobile device (e.g., a handheld device). Some other embodiments of the invention include or employ an uncalibrated camera device which is not readily portable. In some embodiments, an uncalibrated camera device (e.g., implemented as a mobile device) is operable to download data indicative of a prior characterization or calibration of a display (e.g., data indicative of a sensitivity function of a reference camera employed to perform the prior characterization or calibration) and to measure at least one characteristic of light emitted by the display using the camera device's camera and the downloaded data in connection with a recalibration of the display.

It is conventional for a user to manually adjust controls of a display device to adjust or calibrate the device while the device displays test patterns (e.g., in response to test pattern data read from a DVD or other disk). While a display device displays test patterns, it is also conventional to use a colorimeter or camera to generate data that characterize the display device and/or are indicative of recommended settings for adjusting or calibrating the display device (e.g., to match target settings). With knowledge of such data, a user can manually adjust (or manually enter commands which cause adjustment of) controls of the display device to obtain a visually pleasing and/or acceptable displayed image appearance or to match target settings. It is also conventional to program a processor to generate control values in response to such data and to assert the control values to a graphics card of the display device to calibrate the display device. For example, it is known to use a computer programmed with appropriate software to generate control values which determine look-up tables (LUTs) in response to such data and to assert the control values to the graphics card (e.g., to match target settings previously provided to the computer).

During adjustment of display devices, test patterns are often displayed. For example, commercially available disks (e.g. DVDs) that store test patterns can be played to cause the device being adjusted to display a sequence of test patterns and prompts to the viewer to manually adjust relevant controls of the device while viewing the patterns (e.g., to correct the device's video parameters to optimize video display).

The adjustment of a video display for optimal picture quality, and the general assessment of displayed image quality and display device characteristics is a challenging task, generally thought to be well outside an average consumer's capabilities. It would be desirable to implement methods and systems that allow consumers to achieve correct display characterization and calibration with acceptable cost and effort. Typical embodiments of the present invention are display calibration methods and systems that employ a mobile (e.g., networked) camera device to perform display calibration, and/or to provide display assessment and education to consumers in a user friendly way.

BRIEF DESCRIPTION OF THE INVENTION

In a class of embodiments, the invention is a method and system for characterizing a display device, including by using a camera device (e.g., a consumer grade, mobile camera device) to sense light emitted by the display device during display of one or more test images, and to generate measurement data characterizing the display and/or calibration data useful (e.g., as feedback) for calibrating the display device. In some embodiments, the camera device includes a processor coupled and configured (e.g., programmed with software) to generate the measurement data (i.e., to receive raw output from the camera device's camera and process the raw output to generate the measurement data) and to generate the calibration data in response to the measurement data, and the display device is adjusted or calibrated manually in response to the calibration data (e.g., by user actuation of display device controls in response to calibration data indicative of at least one target display setting). In some embodiments, the display device is calibrated automatically in response to the calibration data, with the calibration data being feedback determined by measurements by the camera device of light emitted from the display device during display of one or more test images. For example, the camera device includes a processor coupled and configured (e.g., programmed with software) to generate the measurement data (i.e., to receive raw output from the camera device's camera and process the raw output to generate the measurement data) and to send the measurement data as feedback to another device (e.g., the display device or a video processor) for generation of the calibration data in response thereto.

Typically, the test image(s) are embedded in a video stream (e.g., overlaid on arbitrary video content), and the test images(s) are indicative of appropriate timing information and calibration sequences. For example, each test image can be included in a promotional or marketing program (e.g., reel) having any of a multitude of video distribution formats and media. Each test image (or a video program in which each test image is embedded) can be played or streamed from the camera device (typically a mobile camera device) employed to characterize the display device, e.g., over a cable between the display device and the camera device, or over a Bluetooth, Wireless HD or other connection. Alternatively, each test image (or a video program in which each test image is embedded) can be sourced from a streamed, synchronous or asynchronous video distribution channel. Preferably, the test image(s) are readily available to or stored in: the display device to be characterized; or a receiver, video playback device, or other consumer device configured to be used with the display device.

During display of a test image sequence in typical embodiments of the invention, a user orients a camera of a camera device to take in the display across the camera's field of view. By employing appropriate capture, analysis and expert systems, the camera device provides feedback for use to assess and/or calibrate the display device.

Examples of attributes that can be measured, calibrated or assessed (and adjustments that can be made) in accordance with various embodiments of the inventive method include: contrast, brightness, color (gain), tint, gamma, detailed RGB adjustments, audio/video latency, offset, sharpness, de-interlacing, motion filters, color gamut, ghosting, xvYCC compatibility, rainbowing, panel response time, purity, convergence, contrast ratio, and scaling.

In order to embed suitable test images (and optionally other information useful for display calibration or characterization) into a video sequence, to allow for accurate display characterization and/or calibration, typical embodiments of the invention employ one or more of the following techniques:

the test images are structured hybrid images including both standard video content (intended to be viewed by a user for purposes other than display calibration or characterization) and display characterization content integrated (typically by a graphic designer, as part of the design of machine rendered artwork), preferably in an aesthetically pleasing manner, with the standard video content. The display characterization content may include calibration and characterization content (e.g., test images and optionally also other test data or content). For example, the hybrid images can include advertising, trademark, and/or branding content, can be informative or entertaining to a viewer, and can also serve as test patterns; and the test images are "watermarked" or otherwise augmented versions of arbitrary video images. A conventional sequence of arbitrary video images (frames) generally lacks sufficient diversity to allow adequate display characterization or calibration. Some simple modifications of conventional video frames to include test image content therein include contrast range expansion and embedded watermarks. Such a modification, along with knowledge of the modification by the analysis tool, typically suffices to achieve accurate calibration and/or characterization. The simplest form of achieving suitable calibration stimulus is to introduce diversity in proximate pixels of each conventional (unmodified) arbitrary frame, in such a way as to allow testing of the display device range without destroying the intended (unmodified) image content. This can be done by introducing a form of modulated dither that adds test image content.

In some embodiments, a display device displays arbitrary (but not degenerate) video content while a camera device is employed to measure light emitted by the display device, either with or without preknowledge of at least some attributes of the camera device's camera (e.g., with or without preknowledge of the camera's sensitivity as a function of frequency of sensed light). Data generated by the camera device using the measurements are employed to perform display characterization (e.g., one or more of color gamut range, contrast ratio, and saturation (brightness and contrast errors)) and optionally also calibration.

In a class of embodiments, display device characterization using a camera device (e.g., a mobile, uncalibrated camera device) includes a step of prompting the user in some manner (e.g., by causing the camera device to display a "guide" on the camera device's display screen) to position the camera such that a test image (being displayed by a display device) at least substantially fills the camera's field of view. With the camera so positioned, the camera stimulus is known in the sense that camera's output during operation is indicative (at least predominantly) of light emitted by the display device. With the camera stimulus being known (e.g., in the sense that a known test image is measured by a camera aligned with a display device which displays the image), much of the uncertainty arising from camera intrinsics and camera control loops can be eliminated using field test data (i.e., data indicative of camera measurements) or provision of reference data (e.g., lookups for various camera and display device combinations) to the camera device. For example, in some embodiments display device characterization is performed using an aligned but uncalibrated camera device, using reference data that have been provided (e.g., downloaded over the internet) to the camera device, where the reference data are indicative of relevant calibration parameters of the camera device's camera, or of cameras in the same class (e.g., model) as said camera.

Preferably, a test image displayed on the display device to be characterized includes a "first" guide (e.g., a distinctive pattern), and another guide (a "second" guide) is generated by the camera device and presented to the user on the camera device's display screen. The user can align the camera device's camera with the display device by moving the camera device so that the second guide matches the first guide on the camera device's display screen. So aligning the first guide with the second guide can achieve very accurate and repeatable positional alignment of the camera with the display device. The edges of each test image displayed by the display device are preferably expendable, in the sense that they are designed such that small variations (e.g., zoom or crop variations) in the camera's field of view do not lead to significant changes in the overall lux detected by the camera (e.g., to avoid AGC variations) when the camera is at least roughly aligned with the display device.

The test image is preferably designed so that small changes in the camera's field of view or likely cropping and scaling distortion of a display device do not lead to significant changes in the overall lux measured by the camera and thus the AGC and/or white balancing operations of the camera. During operation of a camera device in some embodiments, it may be desirable to control the camera (e.g., at a suitable low level) to capture the raw visual sensing, especially if the camera automatically implements sophisticated AGC and/or white balancing operations that can be effectively disabled by so controlling the camera. Or, the camera's AGC and/or white balancing operations are disabled during performance of some embodiments of the inventive method where this is possible.

When a camera device is properly aligned with the screen of a display device (so that images displayed by the display device dominate the field of view of the camera device's camera), ambient lighting typically does not make a significant impact on the camera's output. Whether or not a camera device has been aligned with a display device (e.g., in accordance with an embodiment of the invention), it is often desirable to characterize and/or calibrate the display device using the camera device (in accordance with an embodiment of the invention) in the ambient lighting expected to be present during normal use of the display device, because the ambient lighting present (during both the characterization/calibration and normal use) may cause noticeable (e.g., barely noticeable) differences in the brightness and contrast (as perceived by a human viewer) of images displayed by the display device. By controlling the ambient lighting during characterization and/or calibration so as to match that expected to be present during normal use, the ambient lighting is part of the test and useful for characterization and/or calibration. For example, in some cases it is preferable to perform display device assessment (e.g., to compare several display devices) with consistent (e.g., dark) ambient lighting for each device being compared.

If required, at least one camera attribute (e.g., focal length, aspherical lens parameters and other geometry corrections) are calibrated using a "structure from motion" process, during performance of an embodiment of the inventive method for display characterization and/or calibration. For example, in some embodiments a camera device executes a structure from motion process (e.g., of a conventional type which determines the three-dimensional structure of an object, in this case an element of the camera device's camera, by analyzing a sequence of two-dimensional images) to determine at least one parameter of a lens of the camera. In the structure from motion process, the camera device's processor processes measurements of a sequence of test images displayed by a display device to determine each such camera lens parameter or other camera attribute.

The appropriate choice of test image(s) and analysis of each test image can remove much uncertainty that would otherwise result from unknown camera parameters, to allow at least some types of reliable display device assessment and calibration using the output of a camera device (even an uncalibrated camera device). For example, in some embodiments the test images displayed by a display device are chosen to allow accurate characterization of the display device using a camera device but without knowledge of at least some characteristics of the camera device's camera.

Provided that the limits of the camera's capabilities (and the limits on preknowledge of the camera's characteristics) are understood, the output of a camera device's camera in response to a displayed test image can provide an indication of a parameter of a display device under test (e.g., an indication useful for calibration of the display device). Even a basic camera having limited capabilities can be sufficient to achieve useful display characterization and calibration. By appropriately processing the camera output, the subjectivity and intelligence of the human eye and human professional is replaced with the determinism and designed processing performed by the camera device.

During performance of some embodiments of the inventive method, both audio and video information are used to achieve synchronization and alignment of a test sequence. In some embodiments, analysis software (e.g., executed by a camera device's processor) uses the geometry of a test image to determine the appropriate alignment of affine transformation and then uses different image sections or embedded stimuli to assess the display device performance.

Preferred embodiments of the invention use a camera device (e.g., a low cost camera device) to measure light emitted by a display device during display of a video test sequence to achieve display device assessment and optionally also calibration. The camera device is typically a mobile device, and the video sequence can be provided to the display device in any of many possible ways (e.g., by downloading or streaming it to the display device, by playing a test DVD or other disc, by playing a test video sequence prestored in the display device, and so on). Aspects of typical embodiments include the following:

a test pattern that is both informative (as required for the calibration or assessment of the display device, including by providing alignment information and other stimulus) and aesthetic (e.g., for marketing purposes);

overcoming camera intrinsics or adaptive adjustments (e.g., AGC, scaling, white balance, integration time or exposure, and so on) and guiding the user to align and fill the camera field of view suitably;

working within limited resolution, frame-rate and capability of the camera device to achieve detailed display performance metrics;

synchronizing and sequencing the test sequence and analysis application software given that the playback and analysis may be asynchronous; and controlling or otherwise handling (e.g., correcting for) ambient lighting variation during display device characterization or assessment.

In accordance with typical embodiments of the invention, a set of test images (sometimes denoted herein as test patterns) is provided for display by the display device to be characterized or calibrated, and a camera device measures light emitted in response to the test images. For example, to allow color calibration the display device can display test images indicative of primary colors (e.g., primaries of a standard color space) and at least one white point (e.g., a standard white point). In some embodiments, all three of color, contrast, and dynamic range calibration of the display device are performed.

An aspect of the invention is a camera device configured (e.g., programmed) to generate measurement data (and/or calibration data) in accordance with any embodiment of the inventive method. Other aspects of the invention include a system or device configured (e.g., programmed) to perform any embodiment of the inventive method, a display calibration (e.g., recalibration) method performed by any embodiment of the inventive system, and a computer readable medium (e.g., a disc) which stores code for implementing any embodiment of the inventive method of steps thereof. For example, the inventive camera device can include a programmable general purpose processor or microprocessor, programmed with software or firmware and/or otherwise configured to perform any of a variety of operations on data, including an embodiment of the inventive method or steps thereof. Such a general purpose processor may be or include a computer system including an input device, a memory, and a graphics card that is programmed (and/or otherwise configured) to perform an embodiment of the inventive method (or steps thereof) in response to data asserted thereto.

DETAILED DESCRIPTION OF THE PREFERRED EMBODIMENTS

Many embodiments of the present invention are technologically possible. It will be apparent to those of ordinary skill in the art from the present disclosure how to implement them. Embodiments of the inventive system and method will be described with reference to FIGS. 1 and 3-6.

Figure 1:
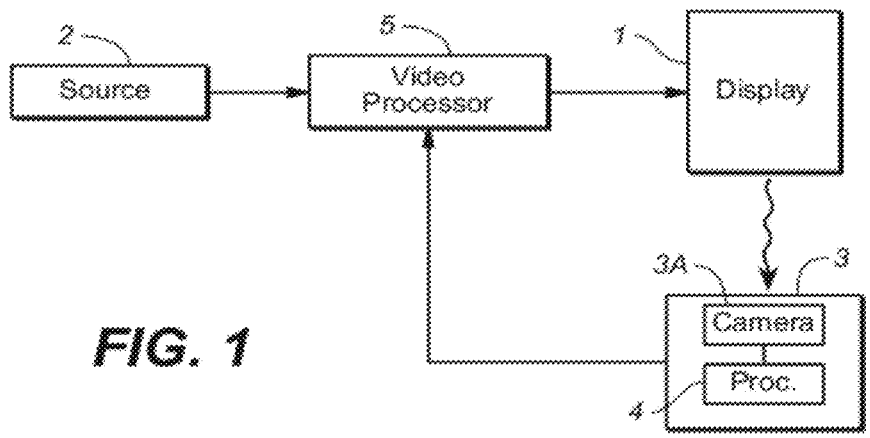
FIG. 1 is a block diagram of an embodiment of the inventive system.

FIG. 1 is a block diagram of an embodiment of the inventive system. The system of FIG. 1 includes display device 1 configured to display images sequentially in response to a video input signal from source 2. Display device 1 may be implemented as any of a variety of display devices, (e.g., a standard LED or LCD display, or another display device).

Video processor 5 is coupled and configured to receive a video input signal from source 2, to perform required processing thereon to generate a video signal for display on device 1, and to assert a video signal to display device 1 for driving the pixels of display device 1. In cases in which display device 1 includes a backlighting or edge-lighting system, processor 5 also asserts an auxiliary video signal to display device 1 for driving device 1's backlighting or edge-lighting elements.

Elements 1 and 5 of the FIG. 1 system can be implemented as subsystems of a single display device, or element 5 can be implemented in (or as) a single device distinct from but coupled to display device 1. Processor 5 is operable in response to feedback generated in accordance with the invention to calibrate (e.g., recalibrate) device 1.

Camera device 3 of FIG. 1 includes camera 3A, and processor 4 coupled to receive the output of camera 3A. Typically, device 3 is a mobile camera device. Device 3 is a mobile, consumer grade, uncalibrated camera device (as defined above) in preferred embodiments.

The FIG. 1 system is preferably configured to use device 3 to capture ambient light and characteristics of display device 1 (e.g., contrast settings), and to use device 3 and processor 5 (coupled, during operation, to device 3's processor 4) to perform tone mapping (mapping of displayed color and brightness values characterizing display device 1 to another set of color and brightness values) or other calibration dynamically in accordance with an embodiment of the invention.

Processor 5 is operable (coupled and configured) to perform calibration (e.g., recalibration) of display device 1 dynamically, by processing an input video signal for device 1 using feedback data (display management parameters) from camera device 3. The calibration typically includes tone mapping.

Measurements of color, contrast and brightness of display device 1 can be made using device 3 in accordance with techniques to be described below. These measurements can be filtered and/or otherwise processed using software (e.g., measurement/acquisition application software) running on processor 4 of device 3. In operation, processor 4 may be coupled with processor 5 (e.g., over the internet or another network) so that the output of device 3 is forwarded as feedback to processor 5. In response to calibration data output from device 3 (which may be indicative of a set of values measured by device 3's camera 3A, or a new (updated) set of control parameters for processor 5), processor 5 applies (or generates and applies) a new set of control parameters to calibrate (e.g., recalibrate) display device 1.

Figure 5:
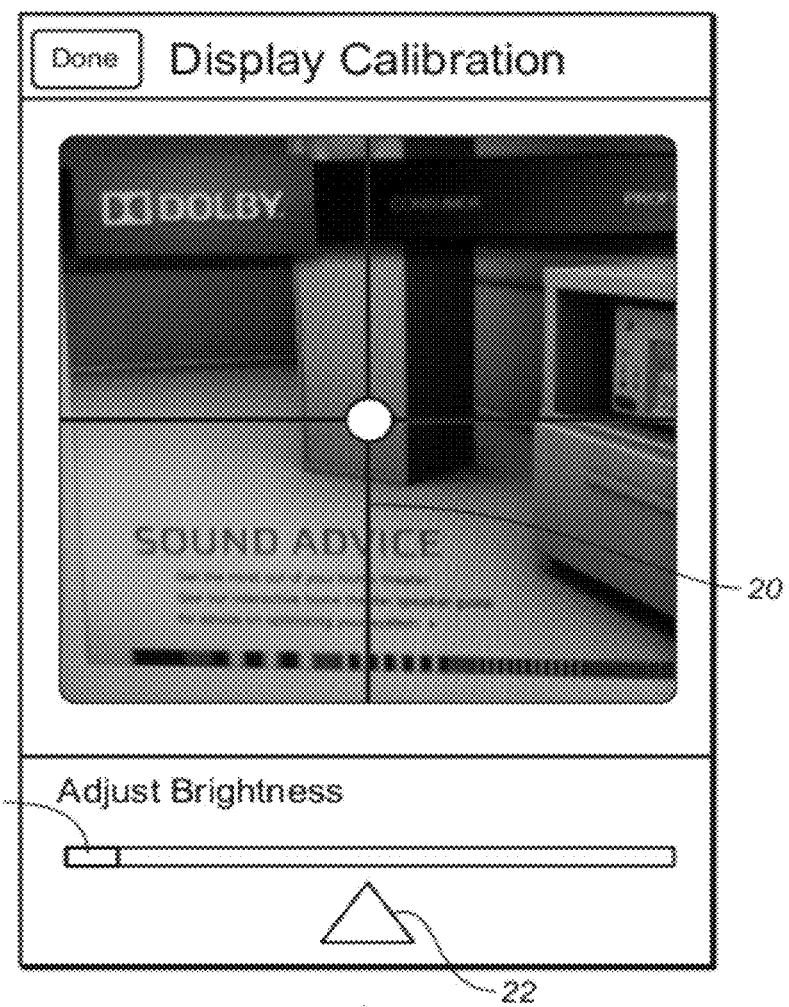
FIG. 5 is a test image including test patterns similar to those of FIG. 3 and also including a camera alignment guide, and a calibration recommendation (human feedback control) below the test image, as displayed by a camera device in accordance with an embodiment of the invention.

Alternatively, camera device 3 generates calibration data indicative of at least one target display setting (e.g., at least one recommended setting of display device 1), and displays each target display setting (e.g., in a manner to be described with reference to FIG. 5). Display device 1 is then adjusted or calibrated manually in response to the calibration data (e.g., by user actuation of controls of display device 1 or processor 5), e.g., until one or more display parameters measured by device 3 (e.g., the parameter indicated by displayed element 21 of FIG. 5) match a target display setting (e.g., the recommended setting indicated by element 22 of FIG. 5).

Device 3 is typically an inexpensive, mobile camera device whose camera 3A is an inexpensive camera. Device 3 is operable to measure light emitted by display 1. Processor 4 of device 3 is coupled and configured to receive raw output from camera 3A and to perform at least some processing on the raw output to generate measurement data.

Processor 5 can be configured to implement any of a variety of tone mapping algorithms to process the input video data asserted thereto, to accomplish calibration (e.g., recalibration) of display device 1. In some embodiments, each set of processor control parameters generated by processor 4 (or by processor 5 in response to measurement data from processor 4) has content and format so as to be useful by processor 5 to implement an appropriate tone mapping algorithm.

For example, processor 5 may implement a conventional tone mapping algorithm of a type known as the Reinhard Tone Mapping Operator ("RTMO"). The RTMO is described in, for example, the paper entitled "Photographic Tone Reproduction for Digital Images," by Erik Reinhard, Mike Stark, Peter Shirley and Jim Ferwerda, ACM Transactions on Graphics, 21 (3), July 2002 (Proceedings of SIGGRAPH 2002).

To generate a set of processor control parameters for use by processor 5 to implement such a conventional tone mapping algorithm to calibrate display 1, processor 4 (or 5) may be configured to process data indicative of the following values: ambient brightness (e.g., determined from measurements using camera 3A of the brightness of display 1's surrounding environment, useful to correct measurements by camera 3A of light emitted from display 1 during test image display), the luminance of the brightest white emitted by display 1 while displaying at least one test image, and the contrast of display (which in turn determines the luminance of the darkest black emitted by display 1 while displaying relevant test image(s)).

The processor control parameters are feedback indicative of measurements by device 3 of light emitted from display 1 (typically during display of at least one test pattern). Thus, in some embodiments, elements 3 and 5 of FIG. 1 are a feedback subsystem of the FIG. 1 system, coupled and configured to generate processor control parameters automatically in response to measurement data (indicative of measurements by device 3) and to use the processor control parameters as calibration feedback. In these embodiments, video processor 5 is operable (coupled and configured) to calibrate (e.g., recalibrate) display 1 in response to the control parameters, e.g., by filtering input image data (e.g., input video data) to be displayed.

In some implementations of the FIG. 1 system, processor control parameters are generated automatically by processor 4 of camera device 3. To generate a set of processor control parameters for use by processor 5 to implement color calibration of display device 1, processor 4 may be configured to process data indicative of light emitted by device 1 in response to a test image (or sequence of test images) indicative of primary colors and at least one white point. Processor 5 may perform all three of color, contrast, and dynamic range calibration of display device 1, provided that processor 4 or 5 generates the required processor control parameters for causing processor 5 to do so.

In typical operation of the FIG. 1 system, test images are displayed on display device 1 while camera 3A of camera device 3 operates to measure light emitted by display device 1, and processor 4 of device 3 generates data indicative of at least one characteristic of display device 1 (e.g., information regarding the display quality that is useful for calibrating device 1).

Preferably, the test image(s) are embedded in a video stream (e.g., overlaid on) a video stream asserted to device 1 (e.g., from source 2 via processor 5 to device 1). For example, the video stream is indicative of arbitrary video content, and test images including appropriate timing information and calibration sequences are overlaid on or otherwise combined with the arbitrary video content. Each test image can be included in a promotional or marketing program (e.g., reel) having any of a multitude of video distribution formats and media. In some implementations, each test image (or a video program in which each test image is embedded) is played or streamed from camera device 3 to processor 5 (e.g., over a cable extending between them, or over a Bluetooth, Wireless HD or other connection). Alternatively, each test image (or a video program in which each test image is embedded) can be sourced from source 2, which implements a streamed, synchronous or asynchronous video distribution channel. Preferably, the test image(s) are readily available to or stored in display device 1, or source 2 (implemented as a receiver, video playback device, or other consumer device configured to be used with processor 5 and display device 1).

During display of a test image or test image sequence, a user typically orients camera 3A of device 3 to take in light emitted by display 1 across camera 3A's field of view. By employing appropriate capture, analysis and expert systems, camera device 3 provides feedback for use to assess and/or calibrate display device 1.

Image detection and processing performed by device 3 can result in display of a recommendation (e.g., recommended direction of adjustment) for adjusting device 1, which the user can cause to be applied to processor 5 or device 1 (e.g., by user entry of appropriate commands). For example, device 1 may implement a startup screen or sequence in which a user is prompted to launch a calibration procedure using camera device 3 in accordance with an embodiment of the invention (e.g., device 1 prompts the user to launch an iPhone app or mobile device to download an application that is then executed by device 3). Device 3 could then be used to view device 1's startup sequence and suggest at least one calibration adjustment, and the user could then key at least one calibration command directly into a user interface of display device 1.

Examples of attributes that can be measured, calibrated or assessed (and adjustments that can be made) in accordance with various embodiments of the invention include: contrast, brightness, color (gain), tint, gamma, detailed RGB adjustments, audio/video latency, offset, sharpness, de-interlacing, motion filters, color gamut, ghosting, xvYCC compatibility, rainbowing, panel response time, purity, convergence, contrast ratio, and scaling.

In order to embed at least one suitable test image (and optionally other information useful for display calibration or characterization) into a video sequence to allow for accurate display characterization and calibration, some embodiments of the invention employ the following technique. Each test image is a structured hybrid image including both standard video content (intended to be viewed by a user for purposes other than display calibration or characterization) and display characterization content integrated, preferably in an aesthetically pleasing manner, with the standard video content (typically by a graphic designer, as part of the design of machine rendered artwork). The display characterization content may include calibration and characterization content (e.g., test patterns or other test images and optionally also other test data or content). For example, a sequence of the hybrid images can include advertising, trademark, and/or branding content, can be informative or entertaining to a viewer, and can also serve as test patterns.

Figure 2:
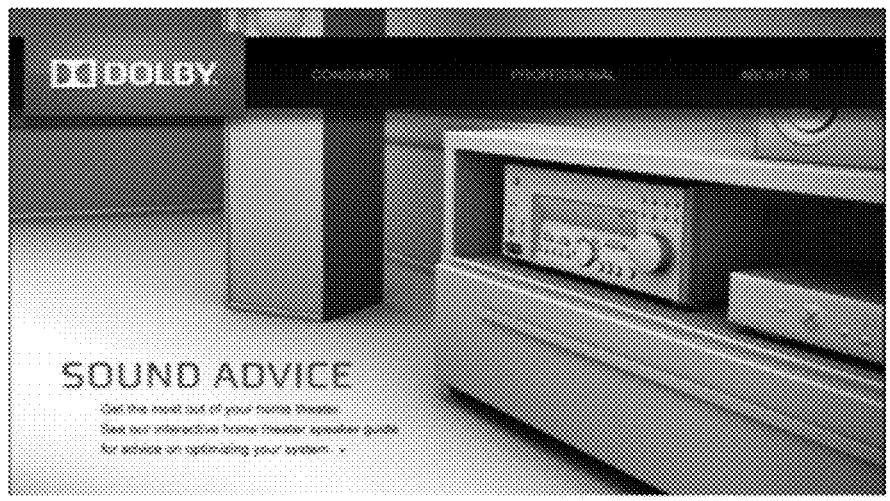
FIG. 2 is a conventional image which does not include a test pattern or other test image content.
Figure 3:
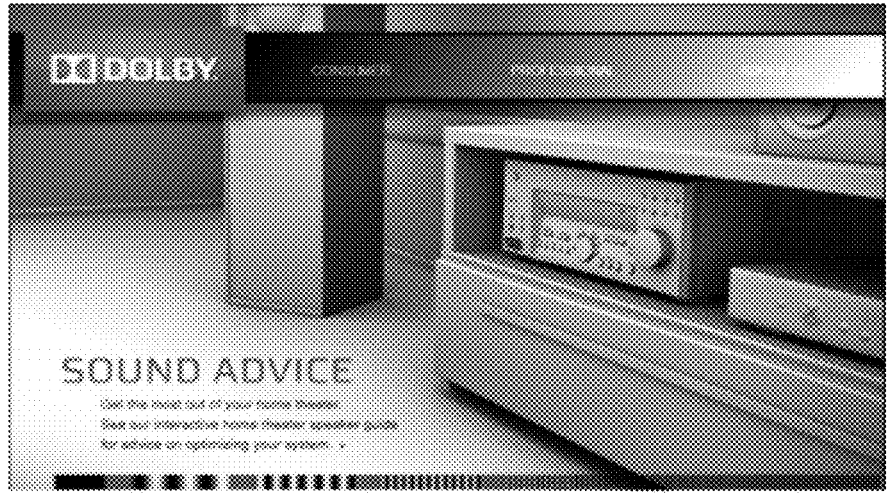
FIG. 3 is a modified version of the FIG. 2 image. To generate the FIG. 3 image, the nontest image of FIG. 2 has been modified to include a test pattern in its banner (for use in performing a luminance range test in an embodiment of the inventive method) and a multiburst test pattern along its bottom edge, and so that the characters that spell the phrase "SOUND ADVICE" have a single, pure color (e.g., unity blue) useful for performing color characterization of a display device in an embodiment of the inventive method.

One such hybrid image is shown in FIG. 3. The FIG. 3 image is a modified version of the standard video image of FIG. 2. The FIG. 2 image does not include a test pattern or other test image, and includes (consists of) content intended to be viewed by a user for purposes other than display characterization. The FIG. 3 image differs from that of FIG. 2 in that a test pattern (whose brightness varies with spatial position) is included in the banner of the FIG. 3 image (to the right of the "Dolby" name and logo). This test image is of a type useful for performing a luminance range test, in which display device 1 of FIG. 1 displays the FIG. 3 image while camera device 3 senses light emitted from device 1. The FIG. 3 image also differs from that of FIG. 2 in that a multiburst test pattern is included along its bottom edge (as a footer below the rest of the image), and the characters spelling the phrase "SOUND ADVICE" are altered to have a single, pure color (e.g., unity blue) so as to be useful for performing color characterization of a display device. The FIG. 3 example is fairly simple. Since the detection and analysis of test image content can be automated (i.e., can be algorithmic), different or additional test patterns can readily be included by modifying the conventional image of FIG. 2.

Some embodiments of the invention employ at least one test image that is a "watermarked" or otherwise augmented version of an arbitrary video image. A conventional sequence of arbitrary video images (frames) generally lacks sufficient diversity to allow adequate display characterization or calibration. Some simple modifications of conventional video frames to include test image content therein include contrast range expansion and embedded watermarks. Such a modification, along with knowledge of the modification by the analysis tool (e.g., processor 4 of device 3 of FIG. 1), typically suffices to achieve accurate calibration and/or characterization in accordance with the invention. The simplest form of achieving suitable calibration stimulus is to introduce diversity in proximate pixels of each conventional (unmodified) arbitrary frame, in such a way as to allow testing of the display device range without destroying the intended (unmodified) image content. This can be done by introducing a form of modulated dither that adds test image content.

Figure 4A:
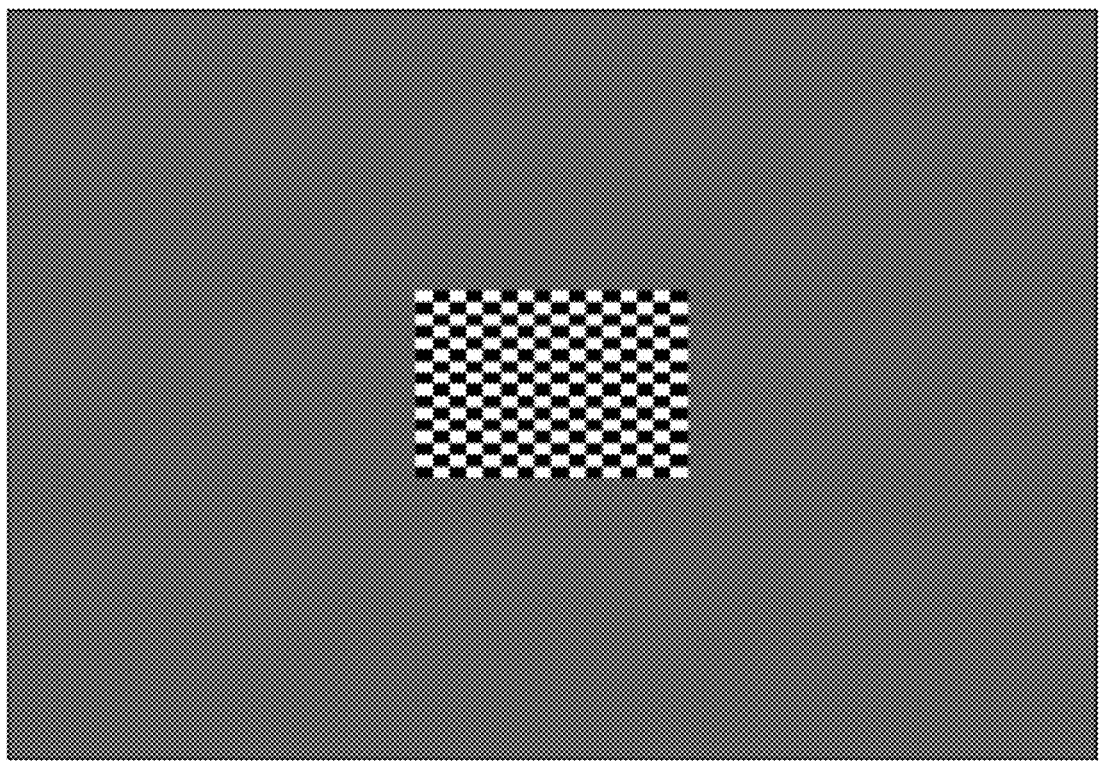
FIGS. 4A, 4B, and 4C are a set of three displayed versions of a watermarking pattern that can be added to an arbitrary video frame in accordance with some embodiments of the invention to allow testing for clamping of luminance. The pattern of FIG. 4A is the watermark pattern as it would appear when displayed without clamping. The pattern of FIG. 4B is the same pattern as it would appear when displayed with a low end clamp in the display device, and the pattern of FIG. 4C is the same pattern as it would appear when displayed with a high end clamp in the display device.
Figure 4D:
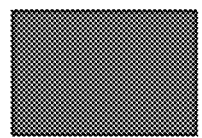
FIG. 4D is the watermarking pattern of FIG. 4A, as it would be viewed when displayed (as it would normally be displayed) at a smaller size than as in FIG. 4A, and without clamping. The dithered center section of FIG. 4D blends with the surrounding section so as to be barely noticeable to either an observer or a camera sensing device without sharp enough focus to resolve the individual pixels.
Figure 4B:
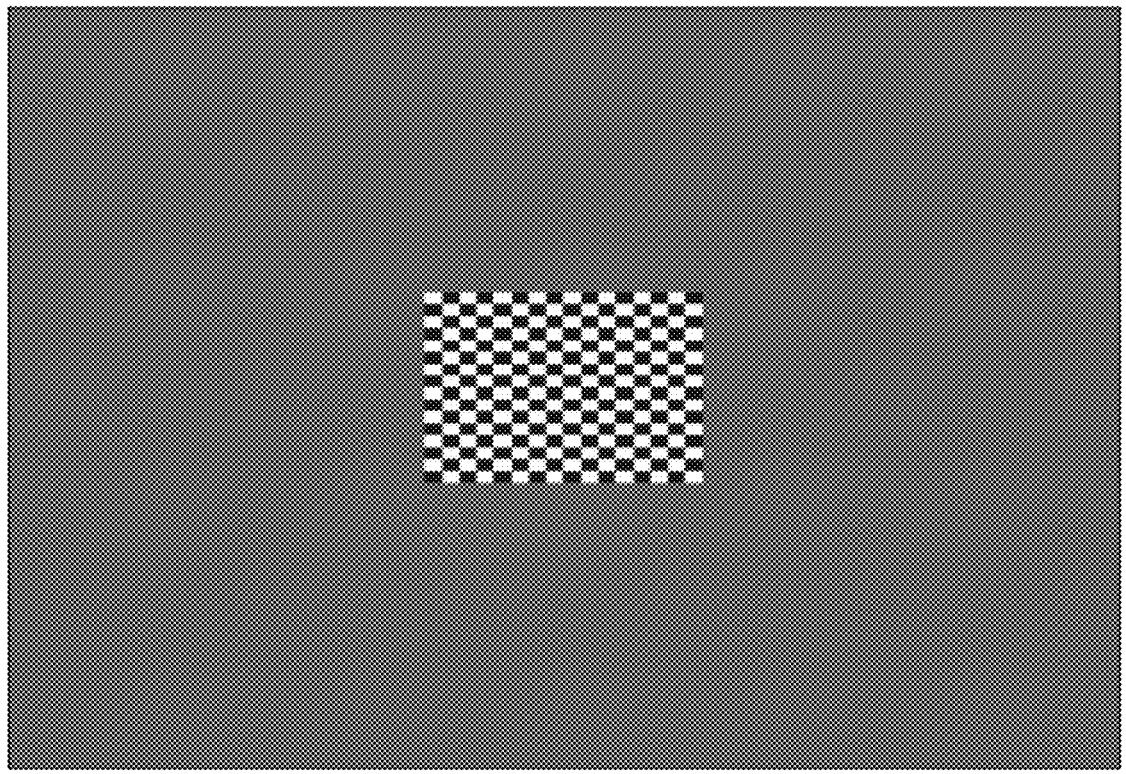
Figure 4E:
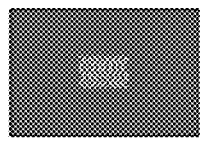
FIG. 4E is the watermarking pattern of FIG. 4B, as it would appear when displayed at the same size as in FIG. 4D but with a low end clamp in the display device. The dithered center section of FIG. 4E appears brighter than the surrounding section.
Figure 4C:
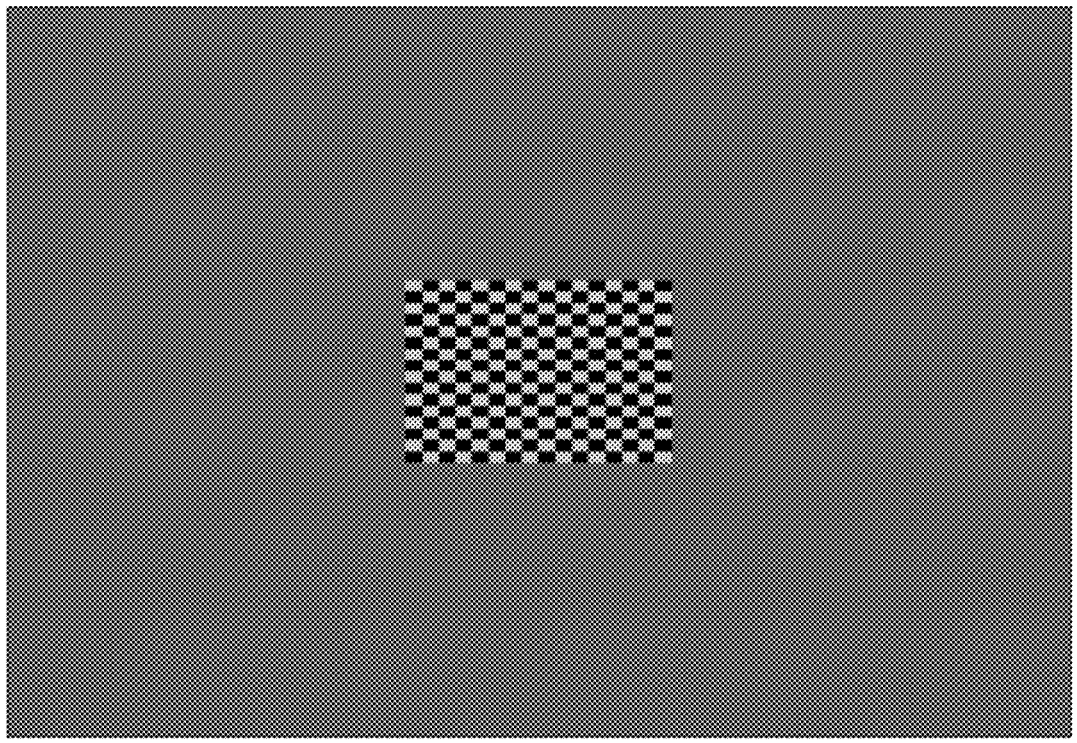
Figure 4F:
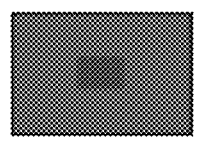
FIG. 4F is the watermarking pattern of FIG. 4C, as it would appear when displayed at the same size as in FIG. 4D but with a high end clamp in the display device. The dithered center section of FIG. 4F appears less bright than the surrounding section.

FIG. 4A is an example of a watermarking pattern that is added to an arbitrary video frame in accordance with some embodiments of the invention, to allow testing for clamping of luminance. For example, in some such embodiments, display device 1 of FIG. 1 displays video watermarked with the FIG. 4A image while camera device 3 senses light emitted from device 1. The watermarking pattern of FIG. 4A is dither which is introduced as a section of alternating intensity pixels at the center of a surrounding region of otherwise fairly constant intensity. At the smaller size (shown in FIG. 4D) at which the FIG. 4A pattern would normally be viewed (when displayed by a display device that displays video watermarked with the FIG. 4A image), the dithered center section of FIG. 4A would blend in with the surrounding section as apparent in FIG. 4D, and be barely noticeable to either an observer or a camera sensing device without sharp enough focus to resolve the individual pixels. It should be apparent that this sort of watermarking or dither can be introduced without large impact on the original (unwatermarked) image. The pattern of FIG. 4B demonstrates the effect of a low end clamp in display device 1, when it displays a video frame whose pixels are indicative of the FIG. 4A pattern. At the smaller size (shown in FIG. 4E) at which the watermarked pattern would normally be viewed (when displayed with a low end clamp by a display device that displays video watermarked with the FIG. 4A pattern), the dithered center section of FIG. 4B has increased brightness relative to the surrounding area as simulated and shown in FIG. 4E. The pattern of FIG. 4C demonstrates the effect of a high end clamp in display device 1, when it displays a video frame whose pixels are indicative of the FIG. 4A pattern. At the smaller size (shown in FIG. 4F) at which the watermarked pattern would normally be viewed (when displayed with a high end clamp by a display device that displays video watermarked with the FIG. 4A pattern), the dithered center section of FIG. 4C has increased brightness relative to the surrounding area as simulated and shown in FIG. 4F.

Some alternative embodiments add a watermarking pattern to an arbitrary video frame to allow testing for clamping of luminance, where the watermarking pattern is dither which is spatially modulated in the sense that the dither varies with distance from the left edge (or alternatively, another edge) of each frame. At a low resolution, the displayed watermarking (dither) pattern would appear as a grey overlay. When viewed with greater resolution, it comprises a pattern of alternating light and dark pixels (rectangular areas) with amplitude variation that increases with increasing distance from the left edge of the video frame on which it is overlaid. A low end clamp would cause the displayed right portion of the watermark pattern to have increased brightness (relative to that of the corresponding portion of the pattern as viewed without clamping). A high end clamp would cause the displayed right portion of the watermark pattern to have decreased brightness (relative to that of the corresponding portion of the pattern as viewed without clamping).

In some embodiments, a display device (e.g., device 1 of FIG. 1) displays arbitrary (but not degenerate) video content while a camera device (e.g., camera device 3 of FIG. 1) is employed to measure light emitted by the display device, either with or without preknowledge of at least some attributes of the camera device's camera (e.g., with or without preknowledge of the camera's sensitivity as a function of frequency of sensed light). Data generated by the camera device using the measurements are employed to perform display characterization (e.g., one or more of color gamut range, contrast ratio, and saturation (brightness and contrast errors)) and optionally also calibration.

In some embodiments, a camera device includes a processor coupled and configured (e.g., programmed with software) to generate measurement data (i.e., to receive raw output from the camera device's camera in response to light emitted by a display device, and to process the raw output to generate the measurement data) and to generate calibration data in response to the measurement data. The display device is adjusted or calibrated manually in response to the calibration data (e.g., by user actuation of display device controls in response to calibration data, displayed by the camera device and indicative of at least one target display setting). For example, camera device 3 of FIG. 1 (preferably implemented as a mobile device) can be implemented to include a display screen (e.g., display screen 11 of FIG. 1) and to generate measurement data in response to a test image (displayed by device 1) of the type shown in the upper portion of FIG. 5. This test image includes test patterns similar to those of FIG. 3. FIG. 5 indicates the test image (displayed by device 1), as sensed by camera 3A and displayed on the camera device's display screen. The camera device's processor (processor 4 of FIG. 1) is also configured to generate calibration data in response to the measurement data. The calibration data are indicative of at least one target display setting (e.g., at least one calibration or adjustment recommendation), and the camera device is configured to display such target display setting on the camera device's display screen. For example, one such target setting (a brightness adjustment recommendation) is displayed in the bottom portion of FIG. 5. This brightness adjustment recommendation includes an indication of measured brightness of display 1 (bar 21 below the word "adjust") and a recommended brightness setting (the location to which triangle 22 at the bottom of FIG. 5 points).

In typical embodiments, display device characterization using a camera device (e.g., a mobile, uncalibrated camera device) includes a step of prompting the user in some manner (e.g., by causing the camera device to display a "guide" on a display screen of the camera device) to position the camera such that a test image (being displayed by a display device) at least substantially fills the camera's field of view. With the camera so positioned, the camera stimulus is known in the sense that camera's output during operation is indicative (at least predominantly) of light emitted by the display device. With the camera stimulus being known (e.g., in the sense that a known test image is measured by a camera aligned with a display device which displays the image), much of the uncertainty arising from camera intrinsics and camera control loops can be eliminated using field test data (i.e., data indicative of camera measurements) or provision of reference data (e.g., lookups for various camera and display device combinations) to the camera device. For example, in some embodiments, characterization of display device 1 is performed using camera device 3 (implemented as an uncalibrated camera device) using reference data that have been provided (e.g., downloaded over the internet) to processor 4 of device 3, where the reference data are indicative of relevant calibration parameters of device 3's camera 3A, or of cameras in the same class (e.g., model) as camera 3A, and where camera 3A is adequately aligned with the screen of device 1 during measurement of light emitted from device 1.

Figure 6:
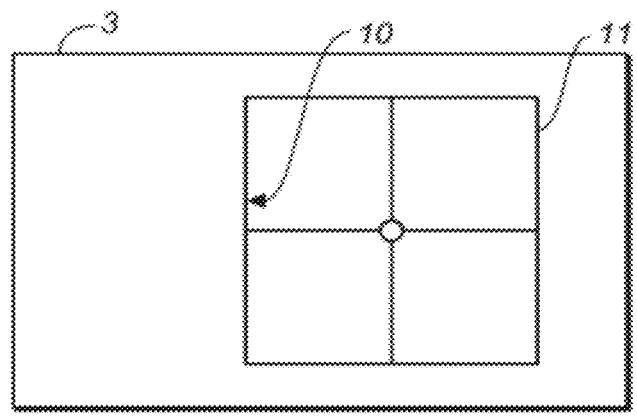
FIG. 6 is camera device including a display screen on which a camera alignment guide (10) is displayed in accordance with an embodiment of the invention.

Camera device 3 of FIG. 6 is an implementation of device 3 of FIG. 1 which includes display screen 11, and is operable to display camera alignment guide 10 on screen 11 as shown in FIG. 6. While viewing guide 10 superimposed on the output of device 3's camera, a user can position the camera such that a test or other image (being displayed by display device 1) at least substantially fills (e.g., fills the majority of) the camera's field of view.

In some preferred implementations of FIG. 1, a test image displayed by display device 1 includes a "first" guide (e.g., a distinctive pattern such as guide 20 of FIG. 5, which is superimposed on the test image at the top of FIG. 5), and another guide (a "second" guide) is presented to the user on the display screen of camera device 3 (e.g., guide 10 on screen 11 of the FIG. 6 implementation of device 3). The user can align camera device 3's camera with display device 1 by moving camera device 3 so that the second guide matches the imaged first guide on the camera device's display screen. So aligning the first guide with the second guide can achieve very accurate and repeatable positional alignment of camera device 3's camera with display device 1. The edges of each test image displayed by display device 1 are preferably expendable, in the sense that they are designed such that small variations (e.g., zoom or crop variations) in the camera's field of view do not lead to significant changes in the overall lux detected by the camera (e.g., to avoid AGC variations) when the camera is at least roughly aligned with the display device.

When camera device 3 is properly aligned with display device 1 (so that images displayed by display device 1 dominate the field of view of camera device 3's camera), ambient lighting typically does not make a significant impact on the camera's output. Whether or not a camera device has been aligned with a display device (e.g., in accordance with an embodiment of the invention), it is often desirable to characterize and/or calibrate the display device using the camera device (in accordance with an embodiment of the invention) in the ambient lighting expected to be present during normal use of the display device, because the ambient lighting present (during both the characterization/calibration and normal use) may cause noticeable (e.g., barely noticeable) differences in the brightness and contrast (as perceived by a human viewer) of images displayed by the display device. By controlling the ambient lighting during characterization and/or calibration so as to match that expected to be present during normal use, the ambient lighting is part of the test and useful for characterization and/or calibration. For example, in some cases it is preferable to perform assessment of display device 1 (e.g., to compare several display devices with device 1) with consistent (e.g., dark) ambient lighting for each device being compared.

If required, one or more attributes (e.g., focal length, aspherical lens parameters and other geometry corrections) of camera 3A (of device 3) are calibrated (e.g., by processor 4) using a "structure from motion" process, during performance of an embodiment of the inventive method for characterization and/or calibration of display device 1. For example, in some embodiments camera device 3 performs a structure from motion process (e.g., of a conventional type which determines the three-dimensional structure of an object, in this case an element of camera device 3's camera, by analyzing a sequence of two-dimensional images) to determine at least one parameter of a lens of camera 3A. In the structure from motion process, processor 4 of camera device 3 may process measurements of a sequence of test images displayed by display device 1 to determine each such camera lens parameter or other camera attribute.

The appropriate choice of test image(s) and analysis of each test image employed during performance of the inventive method can remove much uncertainty that would otherwise result from unknown camera parameters, to allow at least some types of reliable display device assessment and calibration using the output of a camera device (even an uncalibrated camera device). For example, in some embodiments the test images (displayed by display device 1) are chosen so as not to require knowledge of at least some characteristics of camera 3A, to allow accurate characterization of display device 1 using camera device 3.

In typical embodiments, because the limits of camera 3A's capabilities (and the limits on preknowledge of camera 3A's characteristics) are understood, the output of camera 3A in response to a test image displayed by device 1 can provide an indication of a parameter of display device 1 (e.g., an indication useful for calibration of device 1). Even a basic camera having limited capabilities can be sufficient to achieve useful characterization and calibration of display device 1. By appropriately processing the camera output, the subjectivity and intelligence of the human eye and human professional is replaced with the determinism and designed processing performed by the camera device.

During performance of some embodiments of the inventive method, both audio and video information are used to achieve synchronization and alignment of the test sequence. In some embodiments, analysis software (e.g., executed by processor 4 of camera device 3) uses the geometry of a test image displayed by display device 1 to determine the appropriate alignment of affine transformation and then uses different image sections or embedded stimuli to assess the performance of display device 1.

During some embodiments of the inventive method, at least one image detected by a camera device (as a result of measuring light emitted by a display device during display of a video test sequence) is scaled, e.g., by performing one or more of image scaling, cropping and padding thereon, and measurement data (indicative of at least one characteristic of the display device) are generated in response to the scaled image data. Steps of alignment and analysis (e.g., as described herein) can be used to determine the extent of scaling of this kind that occurs in the signal processing path. Watermarked content or specific features can be introduced at the edges or other appropriate regions of the test images to determine aspect ratio, and appropriate fitting of a detected image (or detected video) on the image sensor array or display screen of the camera device.

To perform measurement, calibration, and/or assessment (e.g., gamma correction) in accordance with some embodiments of the invention, the video test sequence includes features similar or identical to those of test sequences employed for conventional calibration and/or assessment. For example, some embodiments of the invention display a video test sequence that is indicative of a checkerboard pattern or a pattern employed for conventional saturation and/or pluge testing, and display calibration and/or assessment in accordance with these embodiments can include a comparison between alternating on/off pixels and constant color pixels (of the test sequence) to perform gamma correction.

Some embodiments of the invention measure a display range for luminance (or component RGB), and optionally determine a calibration recommendation for the display device being tested. A luminance (or any color) histogram of a displayed test image is employed as a general signal in which useful information is embedded. An existing test image is modified (or a new test image authored) in accordance with some embodiments of the invention to introduce a specific shape, or excitation, and/or another feature into the histogram (e.g., a test image having a watermarked luminance, or color, histogram is generated in accordance with some such embodiments). The specific feature set (e.g., watermark) introduced into the histogram is a signature which can then be measured by a camera device (if the camera device is operated to measure light emitted by a display device which displays the test image). Typically, easily recognizable features are introduced into the test image histogram. This can be done by changing (e.g., 'nudging') the luminance values of an existing image to produce the features (e.g., by quantization to discrete levels, making an existing histogram into a set of spikes, which will still leave the original image largely intact). Alternatively, a specific test pattern can be designed to have the desired histogram features, or some combination of modification of an existing test image and generation of a new test image can be employed. When a camera device is employed to sense light emitted from a display device during display of the test image whose histogram has recognizable features, the camera device may detect many common calibration distortions as shifts, stretching, sloping, compression or saturation of the measured histogram (relative to the measured signature it would have if the test image were displayed by a correctly calibrated display device). If the histogram of such a test image (as displayed by a correctly calibrated display device) is known (e.g., to the camera device), then the observed histogram (measured in accordance with the present invention by the camera device) can be informative, even despite AGC and other camera device uncertainties provided that the test image at least substantially fills the camera field of view during operation of the camera device to measure the histogram. For example, if the alignment process described herein (e.g., to align the displayed image with the camera field of view) is employed to determine a luminance (or color component) histogram of the measured test image, the recognizable features will typically appear as a component within that histogram. The camera device can then perform a pattern matching process to find the features (the signature histogram), and use them to determine aspects of the display calibration.

For clarity, consider an example of a monochrome test image (or the luminance only of a full color test image), and a single input, single output system in which the test image is displayed and luminance of the displayed output is captured by a camera device. In the exemplary embodiment, the captured luminance is analyzed to characterize some aspect of the display device. More specifically, the test image is watermarked and a single histogram-based representation of one channel of the system is analyzed. Where the camera's dynamic range exceeds that of the display device (which is common for consumer grade cameras), an appropriate watermarked test image can provide useful information on the scaling and saturation that may occur on the image channel as it is displayed by the display device. With a color test image, since display variations and color mappings may be involved, the system could alternatively be considered as a multiple input, multiple output system and additional calibration information for a color display device could be obtained by considering the individual color channels (e.g., RGB) of the system.

Figure 7A:
FIG. 7A is a luminance histogram of the FIG. 7B image.
Figure 7B:
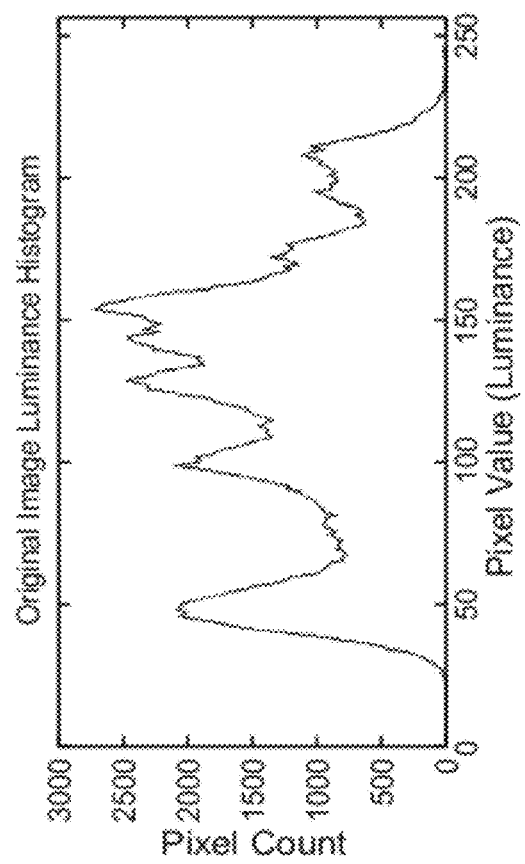
FIG. 7B is a test image.
Figure 7D:
FIG. 7D is a test image which is a watermarked version of the FIG. 7B image, and is employed in some embodiments of the invention.
Figure 7F:
FIG. 7F is a version of the FIG. 7D image as captured by a camera device during display of the FIG. 7D image by a display device (e.g., as viewed on a display of the camera device during the capture).

FIG. 7A shows a luminance histogram of a test image (e.g., a monochrome test image, or one color channel of a full color test image), where the test image is an unwatermarked image which has not been watermarked as mentioned in the previous paragraph. The luminance values of the individual pixels (the "pixel values") represented by the FIG. 7A histogram range from 0 to 255. The unwatermarked test image is shown in FIG. 7B. In accordance with an exemplary embodiment, the pixels of the FIG. 7B test image are modified (watermarked) to cause the watermarked test image (shown in FIG. 7D) to have a desired histogram (shown in FIG. 7C). The pixel values of the watermarked test image of FIG. 7D are spread evenly across a typical displayed intensity range, except that there are two regions of high probability pixel value (the two peaks of the histogram of FIG. 7C). The watermarking process preferably leaves the original image structure (i.e., that of FIG. 7A) intact, although it may create some mild highlighting and banding in the watermarked image. FIG. 7E is a histogram of an actual capture (by a camera device) of light emitted from an LCD display device while the display device displays the FIG. 7D watermarked image, where the camera is positioned during the capture to allow the captured image to fill the camera device's display screen. FIG. 7F is the captured image as viewed on the camera device's display screen. A slight change in aspect and scaling of the FIG. 7D image due to the processes of display (by the display device) and capture (by the camera device) is apparent from a comparison of FIGS. 7D and 7F.

Figure 7C:
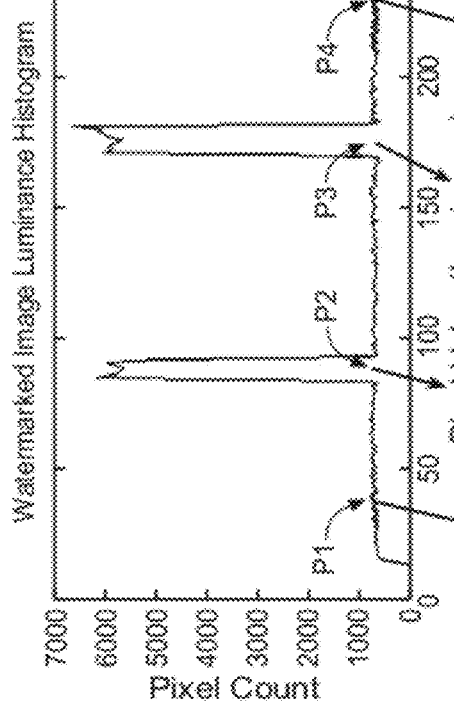
FIG. 7C is a luminance histogram of the FIG. 7D image.
Figure 7E:
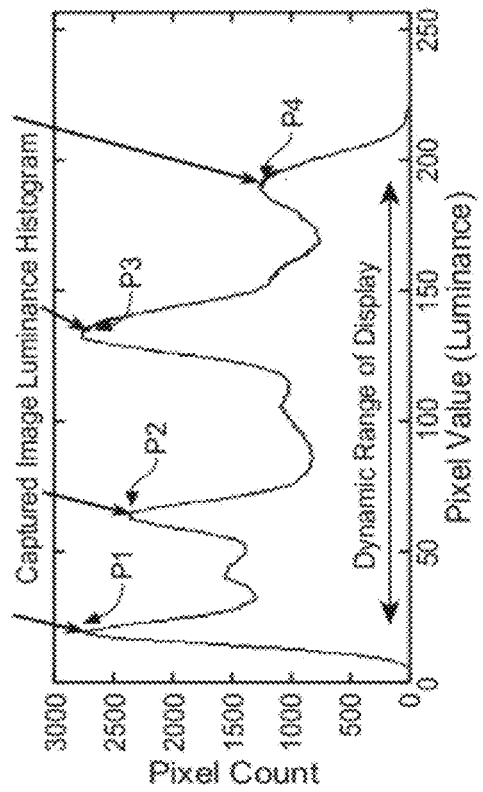
FIG. 7E is a luminance histogram of the FIG. 7F image (as captured by the camera device).

It is apparent from inspection of FIG. 7E that characteristics of the FIG. 7C histogram are softened or smoothed in the display and capture process. This is a typical result of filtering and smoothing in the display or camera device, pixelation effects and resampling in the camera capture, variations in individual display or camera pixel sensitivities and the influence of ambient lighting. However, the two central peaks in the FIG. 7E histogram correspond to the two peaks introduced into the watermarked image histogram (FIG. 7C), and are very distinct in FIG. 7E and thus provide a means of registration (alignment) of the watermarked and captured histograms to determine display calibration properties. The displayed image falls within the camera's dynamic range, so that the captured histogram (FIG. 7E) is not saturating at either the upper or lower limit of captured luminance. Thus the captured histogram is a useful representation of the histogram (FIG. 7C) of pixels of the watermarked test image as displayed by the display device. It is apparent from FIG. 7E that the display brightness is set too low. The accumulation of pixels at the bottom end of the display dynamic range indicates that a portion of the low value pixels in the displayed image are of equal brightness at the level of minimum brightness for the display device and viewing conditions. There is also a slight accumulation of pixels at the upper limit of the display brightness. The approximate registration points (P1, P2, P3, and P4) for alignment of FIG. 7E with FIG. 7C are annotated in FIGS. 7C and 7E, giving an indication of the displayed range of the test image histogram (FIG. 7C) against the captured image histogram (FIG. 7E). This example would suggest the display be adjusted to increase brightness and slightly reduce contrast.

The process of watermarking the histogram can be achieved in many different ways. The approach described with reference to FIGS. 7C-7F attempts to preserve as much of the original image as possible. The extent to which whitening (constant spreading) and registration peaks are introduced is related to the degree of unknowns and complexity of the signal processing employed to infer display calibration information from the captured histogram. The example of FIGS. 7C-7F is instructive in demonstrating a signal watermark that is easily visible and recognisable in the captured image. There are many known signal processing techniques for watermarking and embedding a signal that allow for a similar ability to determine a display device characteristics with less impact on the original source image in the watermarking process. It should be apparent that embodiments of the present invention employ a signal transmission system in which an additional signal (e.g., watermarking signal) is introduced to a transmitted image, and the modified image is used to develop a better measure of distortions occurring during display. The transmission system is the display device and camera device, and the signals analyzed can be histogram representations of the image pixels and of the captured pixels of the displayed image.

Alternatively, an unwatermarked test image (e.g., the image of FIG. 7B) having known luminance histogram (e.g., that of FIG. 7A) could be used for display calibration, where this histogram itself contains enough information for determining the calibration information. While the FIG. 7A histogram (or a histogram of another unwatermarked test image) may not be a useful example (since the corresponding captured histogram would typically be complex), a signal processing or fitting process could employ a simple model of the display incorporating scaling, saturating and spreading (smoothing), to register the captured histogram with the histogram of the unwatermarked image.

Typically, it would be beneficial to shape the original histogram (of the unwatermarked image) by watermarking, to reduce uncertainty in the process by using the resulting watermarked image rather than the unwatermarked image. Another example of watermarking the FIG. 7B image is to introduce two regions, each of single intensity, thereto to produce the watermarked test image of FIG. 8. FIG. 9, the luminance histogram of the FIG. 8 image, has s substantially flat intensity histogram with two peaks corresponding to the introduced (overlayed) single intensity regions. This is a type of overlay watermark, and it can reduce distortion of the original test image (e.g., it can reduce banding such as that apparent in FIG. 7D in the example of FIGS. 7C-7F). However, this distortion reduction is at the expense of introduced image components (e.g., the single intensity blocks in FIG. 8). The addition of particular components or 'test patterns' in an image in this way is another approach for watermarking as suggested in the embodiments of this invention.

Figure 8:
FIG. 8 is another watermarked test image employed in some embodiments of the invention.
Figure 10:
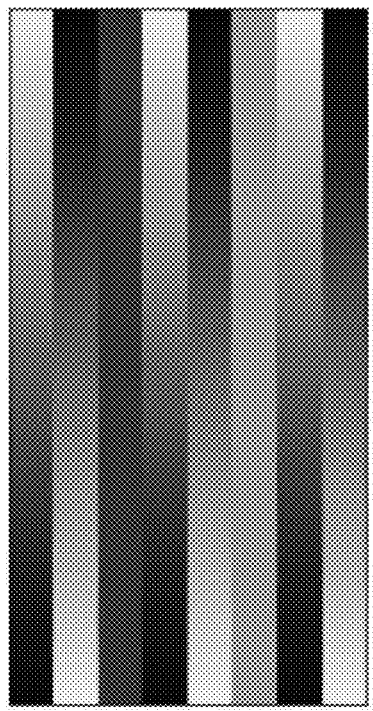
FIG. 10 is another test image employed in some embodiments of the invention.
Figure 9:
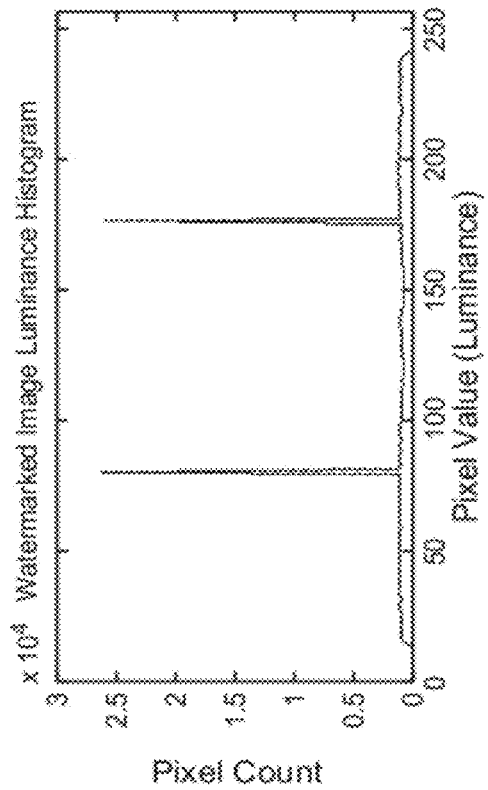
FIG. 9 is a luminance histogram of the FIG. 8 image.
Figure 11:
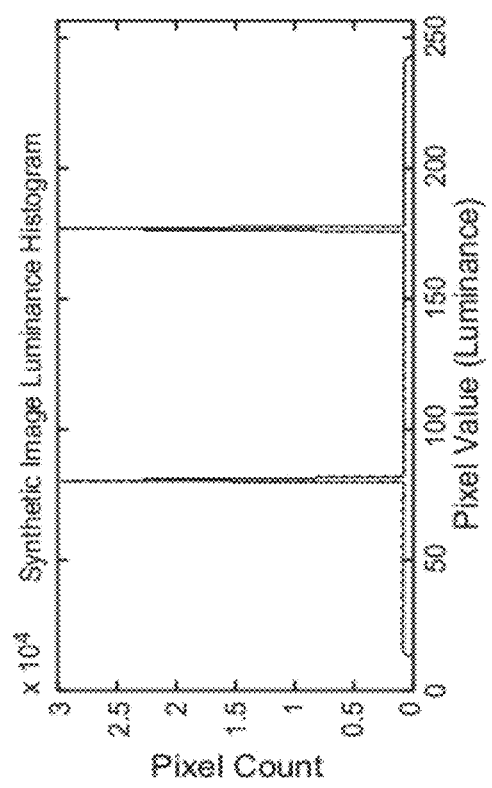
FIG. 11 is a luminance histogram of the FIG. 10 image.

FIG. 10 is a test image of a type used in another embodiment of the invention (e.g., in place of the test image of FIG. 7B, 7D, or FIG. 8). The FIG. 10 test image is a completely artificial test pattern whose luminance histogram is shown in FIG. 11.

The embodiments described with reference to FIGS. 7A-7F and 2-11 are examples of the inventive method and also of the range of test image construction techniques (original, watermarked and artificial test images) that can be employed in accordance with the invention to achieve display calibration or characterization. Specific methods of using comparison, registration and analysis of input and output pixel intensity histograms have bee described. Such methods are typically feasible to implement using low cost consumer cameras, and are typically robust to alignment and variations in the way the displayed image is captured by the camera device. The single channel or intensity histograms can provide information regarding brightness, contrast and gamma of a display device. Using separate color components would provide further information on color mappings and calibration.

Preferred embodiments of the invention use a camera device (e.g., device 3 of FIG. 1, implemented as a low cost camera device) to measure light emitted by a display device during display of a video test sequence to achieve display device assessment and optionally also calibration. The camera device is typically a mobile device, and the video sequence can be provided to the display device in any of many possible ways (e.g., by downloading or streaming it to display device 1 of FIG. 1, by operating source 2 of FIG. 1 to play a test DVD or other disc, by playing a test video sequence prestored in display device 1, and so on). Aspects of typical embodiments include the following:

a test pattern (e.g., that of FIG. 3) that is both informative (as required for the calibration or assessment of the display device, including by providing alignment information and other stimulus) and preferably also aesthetic (e.g., for marketing purposes);

overcoming camera intrinsics or adaptive adjustments (e.g., AGC, scaling, white balance, integration time or exposure, and so on) and guiding the user to align and fill the camera field of view suitably;

working within limited resolution, frame-rate and capability of the camera device to achieve detailed display performance metrics;

synchronizing and sequencing the test sequence and analysis application software given that the playback and analysis may be asynchronous; and handling ambient lighting variation and correcting for the assessment.

In some embodiments, a camera device (e.g., device 3 of FIG. 1) of the inventive system is or includes a field-programmable gate array (FPGA), or other integrated circuit or chip set, programmed and/or otherwise configured to perform steps of an embodiment of the inventive method in response to data asserted thereto. In some embodiments, a camera device (e.g., device 3 of FIG. 1) of the inventive system is a programmable digital signal processor (DSP) programmed and/or otherwise configured to perform processing, including steps of an embodiment of the inventive method, on data. Alternatively, a camera device (e.g., device 3 of FIG. 1) of the inventive system includes a programmable general purpose processor (e.g., a PC or other computer system or microprocessor) or a computer system including a processor, an input device, a memory, and a graphics card, coupled to receive or to generate input data, and programmed with software or firmware and/or otherwise configured (e.g., in response to control data) to perform any of a variety of operations on the input data, including steps of an embodiment of the inventive method. A general purpose processor configured to perform steps of an embodiment of the inventive method would typically be coupled to an input device (e.g., a mouse and/or a keyboard), a memory, and a display device.

Another aspect of the invention is a computer readable medium (e.g., a disc) which stores code for implementing any embodiment of the inventive method or steps thereof.

While specific embodiments of the present invention and applications of the invention have been described herein, it will be apparent to those of ordinary skill in the art that many variations on the embodiments and applications described herein are possible without departing from the scope of the invention described and claimed herein. It should be understood that while certain forms of the invention have been shown and described, the invention is not to be limited to the specific embodiments described and shown or the specific methods described.

What is claimed is:

1. A method for characterizing a display, including the steps of:
    (a) operating the display to display at least one test image embedded in a video sequence; and
    (b) while performing step (a), operating a camera device to measure light emitted from the display, and to generate measurement data indicative of at least one characteristic of the display, wherein step (a) includes the step of operating the display to display a sequence of test images, wherein the test images are structured hybrid images, each including standard video content intended to be viewed by a user for purposes other than display characterization, and display characterization content is integrated with the standard video content.

2. The method of claim 1, wherein at least one of the structured hybrid images includes standard video content including text, and at least one test pattern integrated with the standard video content.

3. The method of claim 1, wherein at least one of the structured hybrid images includes a multiburst test pattern integrated with the standard video content.

4. A method for characterizing a display, including the steps of:
    (a) operating the display to display at least one test image embedded in a video sequence; and
    (b) while performing step (a), operating a camera device to measure light emitted from the display, and to generate measurement data indicative of at least one characteristic of the display, wherein step (a) includes the step of operating the display to display a sequence of test images, wherein the test images are watermarked versions of nontest images, and each of the nontest images includes content intended to be viewed by a user for purposes other than display characterization.

5. The method of claim 4, wherein the test images are versions of the nontest images to which modulated dither has been introduced.

6. The method of claim 1, wherein the camera device includes a camera, and also including the step of:
    (c) operating at least one of the display and the camera device to prompt a user to position the camera such that light emitted from at least one test image displayed by the display at least substantially fills the camera's field of view.

7. The method of claim 6, wherein step (c) includes the step of operating the display to display a camera alignment guide with said at least one test image, to prompt the user to align the camera with said at least one test image.

8. The method of claim 6, wherein step (c) includes the step of operating the camera device to display a camera alignment guide to prompt the user to align the camera with said at least one test image.

9. The method of claim 1, wherein the camera device includes a camera, and also including a step of:
operating the camera device to calibrate at least one attribute of the camera by executing a structure from motion process while said camera measures light emitted from the display.

10. A method for characterizing a display, including the steps of:
(a) operating the display to display at least one test image embedded in a video sequence;
(b) while performing step (a), operating a camera device to measure light emitted from the display, and to generate calibration data indicative of at least one target setting for the display; and
(c) operating the camera device to display an indication of the target setting.

11. The method of claim 10, wherein step (a) includes the step of operating the display to display a sequence of test images, wherein the test images are structured hybrid images, each including standard video content intended to be viewed by a user for purposes other than display characterization, and display characterization content is integrated with the standard video content.

12. The method of claim 11, wherein at least one of the structured hybrid images includes standard video content including text, and at least one test pattern integrated with the standard video content.

13. The method of claim 11, wherein at least one of the structured hybrid images includes a multiburst test pattern integrated with the standard video content.

14. The method of claim 11, wherein step (a) includes the step of operating the display to display a sequence of test images, wherein the test images are watermarked versions of nontest images, and each of the nontest images includes content intended to be viewed by a user for purposes other than display characterization.

15. The method of claim 14, wherein the test images are versions of the nontest images to which modulated dither has been introduced.

16. The method of claim 10, also including the step of:
using the calibration data as feedback for controlling calibration of the display.

17. The method of claim 16, wherein step (a) includes the step of operating the display to display a sequence of test images, wherein the test images are structured hybrid images, each including standard video content intended to be viewed by a user for purposes other than display characterization, and display characterization content is integrated with the standard video content.

18. The method of claim 17, wherein at least one of the structured hybrid images includes standard video content including text, and at least one test pattern integrated with the standard video content.

19. The method of claim 17, wherein at least one of the structured hybrid images includes a multiburst test pattern integrated with the standard video content.

20. The method of claim 16, wherein step (a) includes the step of operating the display to display a sequence of test images, wherein the test images are watermarked versions of nontest images, and each of the nontest images includes content intended to be viewed by a user for purposes other than display characterization.

21. The method of claim 20, wherein the test images are versions of the nontest images to which modulated dither has been introduced.

22. The method of claim 10, wherein the camera device includes a camera, and also including the step of:
(d) operating at least one of the display and the camera device to prompt a user to position the camera such that light emitted from at least one test image displayed by the display at least substantially fills the camera's field of view.

23. The method of claim 22, wherein step (d) includes the step of operating the display to display a camera alignment guide with said at least one test image, to prompt the user to align the camera with said at least one test image.

24. The method of claim 22, wherein step (d) includes the step of operating the camera device to display a camera alignment guide to prompt the user to align the camera with said at least one test image.

25. A method for calibrating a display, including the steps of:
(a) operating the display to display at least one test image embedded in a video sequence;
(b) while performing step (a), operating a camera device to measure light emitted from the display, and to generate calibration data indicative of at least one target setting for the display, wherein the camera device includes a camera, and also including a step of:
operating the camera device to calibrate at least one attribute of the camera by executing a structure from motion process while said camera measures light emitted from the display.

26. A system for characterizing a display, including:
a display subsystem including the display, wherein the display subsystem is configured to display at least one test image embedded in a video sequence; and
a camera device which includes a camera and a processor coupled to the camera, wherein the camera device is configured to measure light emitted from the display and to generate measurement data indicative of at least one characteristic of the display, wherein the camera device is operable to assert to the display video data that determine the video sequence including the at least one test image embedded therein.

27. The system of claim 26, wherein the camera device is a mobile camera device.

28. The system of claim 26, wherein the display subsystem includes a video source coupled to the display, and the video source is operable to assert to the display video data that determine the video sequence including the at least one test image embedded therein.

29. The system of claim 26, wherein the video sequence is indicative of a sequence of test images, and the test images are structured hybrid images, each including standard video content intended to be viewed by a user for purposes other than display characterization, and display characterization content is integrated with the standard video content.

30. The system of claim 26, wherein the video sequence is indicative of a sequence of test images, the test images are watermarked versions of nontest images, and each of the nontest images includes content intended to be viewed by a user for purposes other than display characterization.

31. The system of claim 26, wherein the at least one of the display device and the camera device is configured to prompt a user to position the camera of said camera device such that light emitted from at least one test image displayed by the display at least substantially fills the camera's field of view.

32. The system of claim 31, wherein the display subsystem is configured to display a camera alignment guide with said at least one test image, to prompt a user to align the camera of said camera device with said at least one test image.

33. The system of claim 31, wherein the camera device is configured to display a camera alignment guide, to prompt a user to align the camera of said camera device with said at least one test image.

34. A system for characterizing a display, including:
a display subsystem including the display, wherein the display subsystem is configured to display at least one test image embedded in a video sequence; and
a camera device which includes a camera and a processor coupled to the camera, wherein the camera device is configured to measure light emitted from the display and to generate measurement data indicative of at least one characteristic of the display, wherein the camera device is configured to calibrate at least one attribute of the camera by executing a structure from motion process while said camera measures light emitted from the display.

35. A system for characterizing a display, including:
a display subsystem including the display, wherein the display subsystem is configured to display at least one test image embedded in a video sequence; and
a camera device which includes a camera and a processor coupled to the camera, wherein the camera device is configured to measure light emitted from the display and to generate calibration data indicative of at least one target setting for the display, wherein the camera device includes a display screen, and the camera device is configured to display an indication of the target setting on the display screen.

36. The system of claim 35, wherein the camera device is a mobile camera device.

37. The system of claim 35, wherein the display subsystem includes a video source coupled to the display, and the video source is operable to assert to the display video data that determine the video sequence including the at least one test image embedded therein.

38. The system of claim 35, wherein the camera device is operable to assert to the display video data that determine the video sequence including the at least one test image embedded therein.

39. The system of claim 35, wherein the display subsystem is configured to calibrate the display, including by using the calibration data as feedback for controlling calibration of the display.

40. The system of claim 35, wherein the video sequence is indicative of a sequence of test images, and the test images are structured hybrid images, each including standard video content intended to be viewed by a user for purposes other than display characterization, and display characterization content is integrated with the standard video content.

41. The system of claim 35, wherein the video sequence is indicative of a sequence of test images, the test images are watermarked versions of nontest images, and each of the nontest images includes content intended to be viewed by a user for purposes other than display characterization.

42. The system of claim 35, wherein the at least one of the display device and the camera device is configured to prompt a user to position the camera of said camera device such that light emitted from at least one test image displayed by the display at least substantially fills the camera's field of view.

43. The system of claim 42, wherein the display subsystem is configured to display a camera alignment guide with said at least one test image, to prompt a user to align the camera of said camera device with said at least one test image.

44. The system of claim 43, wherein the camera device is configured to display a camera alignment guide, to prompt a user to align the camera of said camera device with said at least one test image.

45. A system for characterizing a display, including:
a display subsystem including the display, wherein the display subsystem is configured to display at least one test image embedded in a video sequence; and
a camera device which includes a camera and a processor coupled to the camera, wherein the camera device is configured to measure light emitted from the display and to generate calibration data indicative of at least one target setting for the display, wherein the camera device is configured to calibrate at least one attribute of the camera by executing a structure from motion process while said camera measures light emitted from the display.

* * * * *